(12) United States Patent
Branson et al.

(10) Patent No.: US 9,189,449 B2
(45) Date of Patent: *Nov. 17, 2015

(54) MEMORY MANAGEMENT IN A STREAMING APPLICATION

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/774,536

(22) Filed: Feb. 22, 2013

(65) Prior Publication Data

US 2014/0215184 A1 Jul. 31, 2014

Related U.S. Application Data

(63) Continuation of application No. 13/751,583, filed on Jan. 28, 2013.

(51) Int. Cl.
*G06F 15/80* (2006.01)
*G06F 17/30* (2006.01)
(Continued)

(52) U.S. Cl.
CPC .............. *G06F 15/80* (2013.01); *G06F 9/5016* (2013.01); *G06F 11/3442* (2013.01);
(Continued)

(58) Field of Classification Search
CPC ... G06F 21/629; G06F 3/1415; G06F 3/1438; G06F 9/45533; G06F 9/5027; G06F 9/5077; G06F 11/3409; G06F 11/3034; G06F 11/323; G06F 11/3433; G06F 11/3466; G06F 15/163; G06F 15/173; G06F 15/80; G06F 17/30516; G06F 2201/865; G06F 17/30958; G06F 11/3065; G06F 15/17; G06F 11/3419; G06F 11/3442; G06F 9/5016
See application file for complete search history.

(56) References Cited

U.S. PATENT DOCUMENTS 5,623,598 A * 4/1997 Voigt et al. .................... 714/47.2
7,613,848 B2 11/2009 Amini et al.
(Continued)

FOREIGN PATENT DOCUMENTS

JP 200833941 A 2/2008

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.
(Continued)

*Primary Examiner* — Hashem Farrokh
(74) *Attorney, Agent, or Firm* — Richard A. Wilhelm; James R. Nock (57) ABSTRACT

One embodiment is directed to a method for processing a stream of tuples. The method may include receiving a stream of tuples to be processed by a plurality of processing elements operating on one or more computer processors. Each of the processing elements has an associated memory space. In addition, the method may include monitoring the plurality of processing elements. The monitoring may include identifying a first performance metric for a first processing element. The method may include modifying the first processing element based on the first performance metric. The modifying of the first processing element may include employing memory management of the associated memory space.

12 Claims, 7 Drawing Sheets

(51) Int. Cl.
*G06F 9/50* (2006.01)
*G06F 11/34* (2006.01)

(52) U.S. Cl.
CPC ..... *G06F 11/3466* (2013.01); *G06F 17/30153* (2013.01); *G06F 17/30516* (2013.01); *G06F 11/3409* (2013.01); *G06F 11/3419* (2013.01)

(56) References Cited

U.S. PATENT DOCUMENTS

| | | | |
|---|---|---|---|
| 7,644,110 B2 | 1/2010 | Nishizawa et al. | |
| 8,095,690 B2 | 1/2012 | Kashiyama et al. | |
| 2003/0145086 A1* | 7/2003 | O'Reilly | 709/226 |
| 2009/0106511 A1* | 4/2009 | Zuckerman et al. | 711/154 |
| 2009/0119238 A1* | 5/2009 | Amini et al. | 706/46 |
| 2009/0307697 A1* | 12/2009 | Hurley et al. | 718/102 |
| 2010/0293532 A1* | 11/2010 | Andrade et al. | 717/140 |
| 2010/0293535 A1 | 11/2010 | Andrade et al. | |
| 2011/0280244 A1* | 11/2011 | Gopinath et al. | 370/392 |
| 2012/0027317 A1* | 2/2012 | Choi et al. | 382/244 |
| 2012/0084531 A1 | 4/2012 | Funk et al. | |
| 2012/0124016 A1 | 5/2012 | Barsness et al. | |
| 2012/0179809 A1 | 7/2012 | Barsness et al. | |
| 2012/0218268 A1 | 8/2012 | Accola et al. | |

OTHER PUBLICATIONS

Bögelsack et al., "Performance of SAP ERP with Memory Virtualization using IBM Active Memory Expansion as an Example", VTDC '11: Proceedings of the 5th International Workshop on Virtualization Technologies in Distributed Computing, pp. 21-28, Jun. 8, 2011, San Jose, CA. ©2011 ACM.

Michel, D., "Active Memory Expansion Performance", IBM, pp. 1-18, ©IBM Corporation 2009, Somers, NY.

Santosuosso et al., "Management System for Processing Streaming Data", filed Jul. 26, 2011, U.S. Appl. No. 13/190,810.

* cited by examiner

MEMORY MANAGEMENT IN A STREAMING APPLICATION

CROSS-REFERENCE TO RELATED APPLICATIONS

This application is a continuation of co-pending U.S. patent application Ser. No. 13/751,583, filed Jan. 28, 2013. The aforementioned related patent application is herein incorporated by reference in its entirety.

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program receive streaming data to be processed by a plurality of processing elements comprising one or more stream operators.

One embodiment is directed to a method for processing a stream of tuples. The method may include receiving a stream of tuples to be processed by a plurality of processing elements operating on one or more computer processors. Each of the processing elements has an associated memory space. In addition, the method may include monitoring the plurality of processing elements. The monitoring may include identifying a first performance metric for a first processing element. The method may include modifying the first processing element based on the first performance metric. The modifying of the first processing element may include employing memory management of the associated memory space.

Yet another embodiment is directed to a computer program product.

BRIEF DESCRIPTION OF THE DRAWINGS

Like reference numbers and designations in the various drawings indicate like elements.

DETAILED DESCRIPTION

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

A "tuple" is data. More specifically, a tuple is a sequence of one or more attributes associated with an entity. Attributes may be any of a variety of different types, e.g., integer, float, Boolean, string, etc. The attributes may be ordered. A tuple may be extended by adding one or more additional attributes to it. In addition to attributes associated with an entity, a tuple may include metadata, i.e., data about the tuple. As used herein, "stream" or "data stream" refers to a sequence of tuples. Generally, a stream may be considered a pseudo-infinite sequence of tuples.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

Computer systems have constraints that may limit their ability to execute a program or process. One limitation results from having a limited amount of memory, such as Random Access Memory (RAM), available to a processor executing the programs or processes. An ongoing issue, therefore, is determining how an operating system can make the best use of the entire RAM that is physically available in the computer system. According to various embodiments, the issue may be mitigated or resolved by compressing portions of programs or processes of a stream computing application which are infrequently used into a smaller space in RAM. The effect is that the amount of RAM available to the other programs or processes may be increased. This may slow down a single program or process (because of having to decompress infrequently referenced portions of the program or process in order to execute them), but allow other programs or processes to in turn run faster (because there is more available memory).

A streaming application may run in a distributed environment, in which a single application is distributed across a plurality of compute nodes. Portions of the application may be referred to as processing elements herein (explained in further detail below). Each processing element has resources associated with it and may run at different speeds for a variety of reasons. The overall performance of the streaming application may be a factor of the slowest processing element. That is, in order for data to flow completely through a streaming application, the slowest processing element or elements of the application may define the performance constraints for the overall application. The other processing elements may be considered to be running faster than desired ("overperforming") when not performing similarly to the slowest processing element(s). According to various embodiments, a streaming application may, however, be modified during its runtime such that resources, such as memory, are diverted from the overperforming processing elements to the slowest processing element(s). An example of a runtime modification of resources available to a streaming application may include altering the memory space associated with a particular processing element. Additional resources may be diverted to the slowest processing element, allowing it to improve its performance so that the overall performance of the operator graph improves, i.e., the slowest processing element and the overperforming processing elements perform similarly.

The performance of a particular processing element in a streaming application may be measured with processing times for a tuple, throughput, and latency, according to some embodiments. "Processing time," as used herein, may refer to the amount of time a processing element takes to process a particular tuple. A "throughput metric," as referred to herein, may represent the rate at which tuples flow through a processing element per unit of time. For example, the throughput may be 10,000 tuples per second if the processing time is 0.0001 seconds. Throughput may be determined by both the average time required to process a tuple and the quantity of tuples received per unit of time by a processing element. A "latency metric," as used herein, may refer to the amount of time a particular tuple is at a processing element. That is, the latency may be the time difference between the timestamp at which the tuple is received at a processing element and the timestamp at which the tuple is output from the processing element, including time in which the tuple is waiting to be processed. Another indicator of the performance of a particular processing element may be whether there is a queue of tuples waiting to be processed. This may occur, for example, when one or more processing elements are providing an input stream to a receiving processing element at a rate that is faster than the receiver can process the tuples. This concept may be referred to herein as a "bottleneck." Additionally, the processing elements or stream operators that are outputting tuples to the receiving processing element may be referred to herein as a "bottleneck stream operator" or "bottleneck processing element." A "queue metric" may be an average, maximum, or mode queue length, or any other suitable metric.

Figure 1:
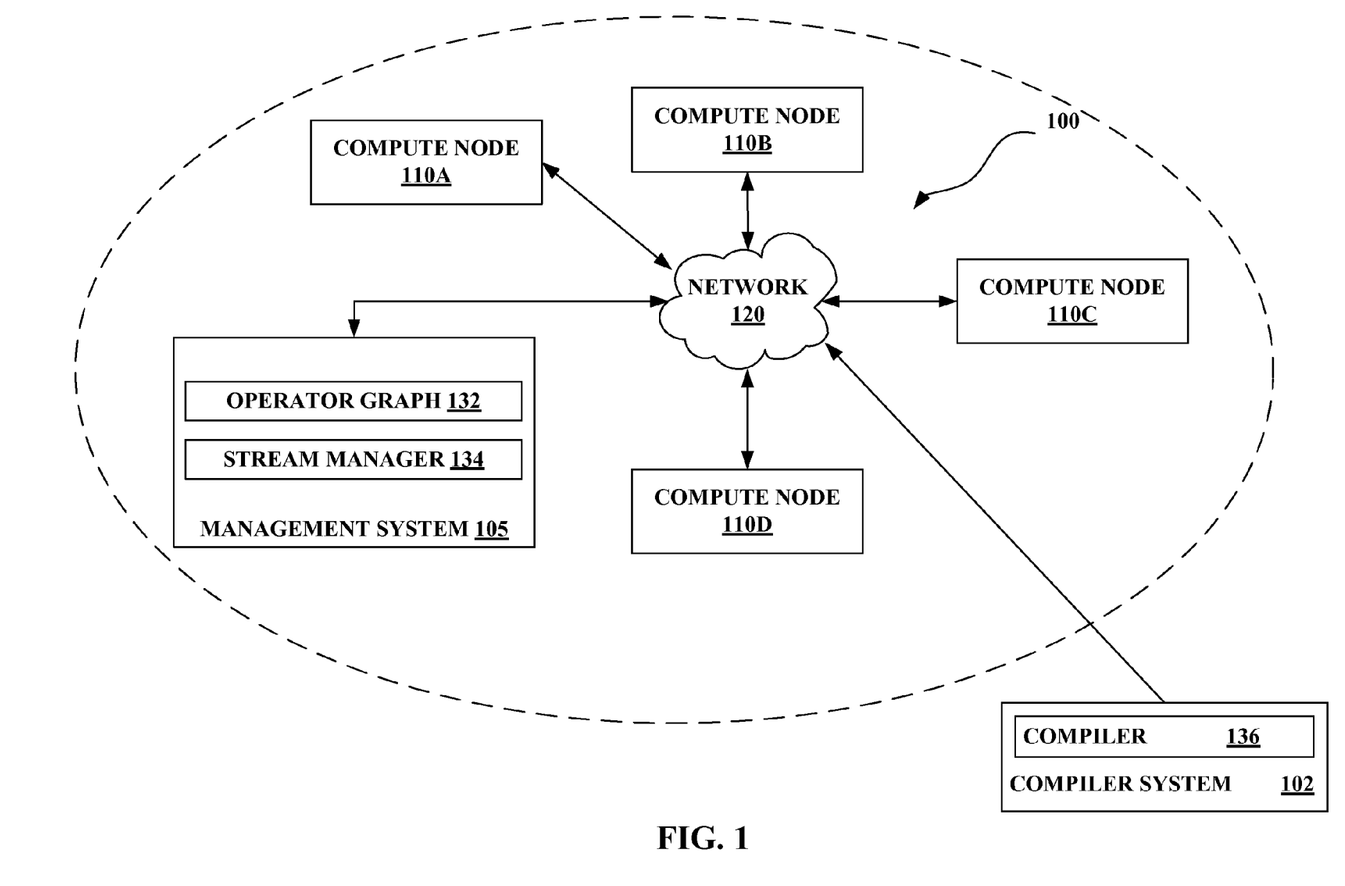
FIG. 1 illustrates a computing infrastructure configured to execute a stream computing application according to various embodiments.

FIG. 1 illustrates one exemplary computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 2:
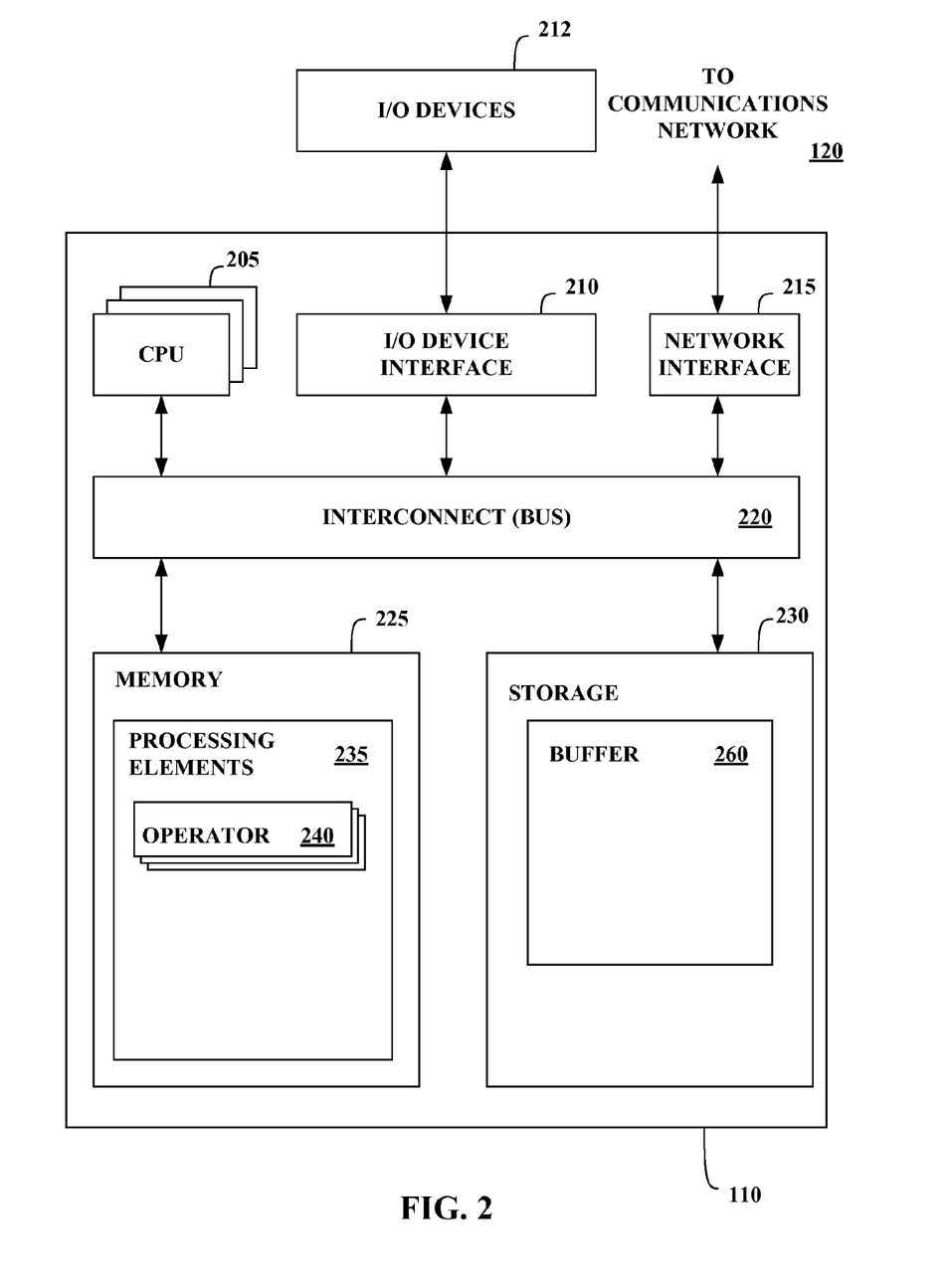
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. A compute node 110 may or may not include a capability to alter the memory space associated with a particular processing element, including a capability to compress portions of programs or processes of a stream computing application that are infrequently used into a smaller space in RAM. The network interface 215 is configured to transmit data via the communications network 120.

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B. In addition, each processing element 235 and stream operator 240 has resources associated with it when a stream computing application is running. For example, a processing element 235 or stream operator 240 may have an associated memory space at runtime.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

Figure 3:
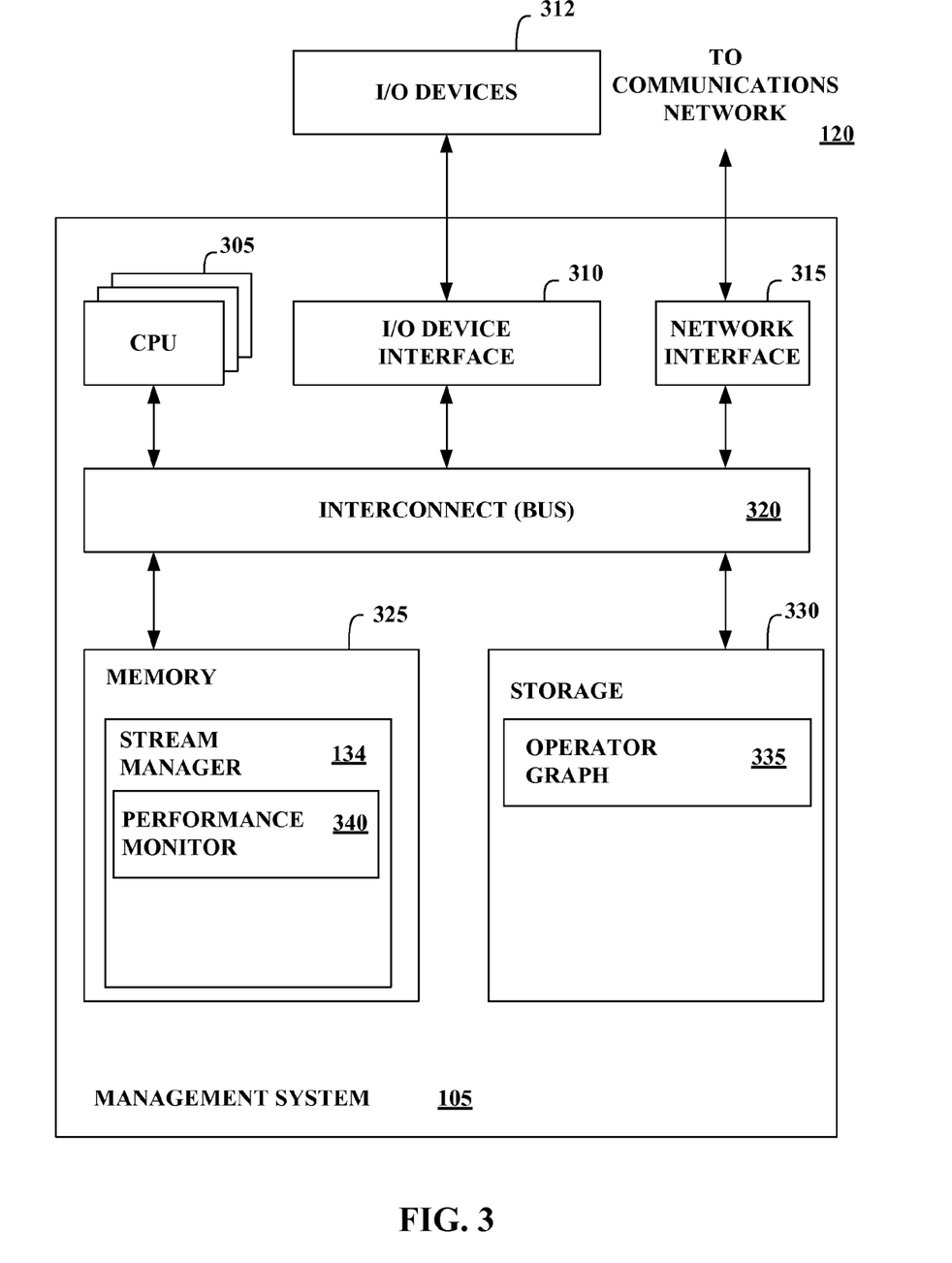
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing. As shown in FIG. 3, the stream manager 134 may also contain a performance monitor 340. The performance monitor 340 may monitor a streaming application, maintaining statistics that represent the performance of the various processing elements that make up the streaming application. The functionality of the performance monitor is discussed in further detail in accordance with FIGS. 6 and 7 below. In some embodiments, the performance monitor may be a part of the stream manager 134 as shown. In other embodiments, the performance monitor may be invoked at runtime, but may be a separate entity from the runtime manager 134.

Figure 4:
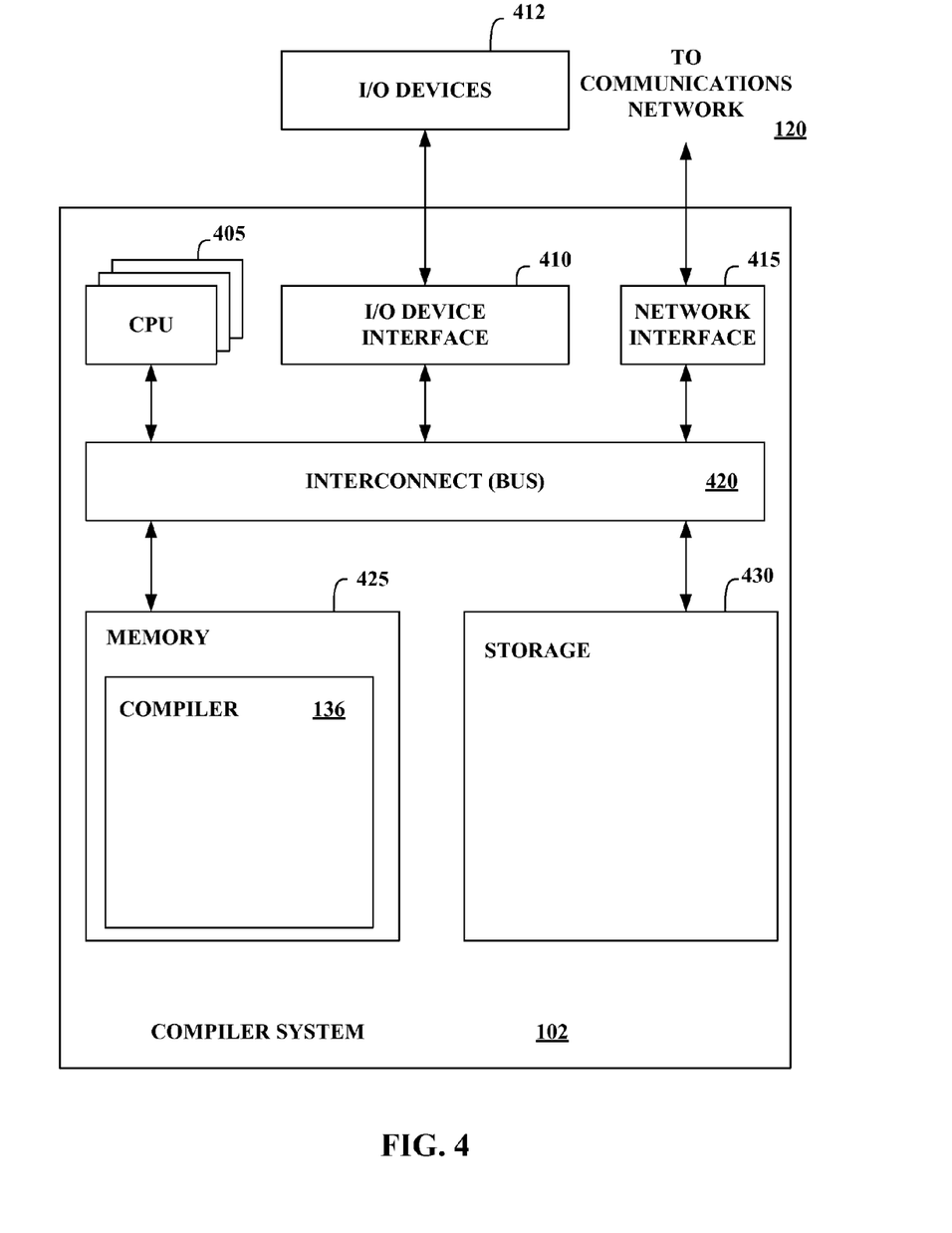
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
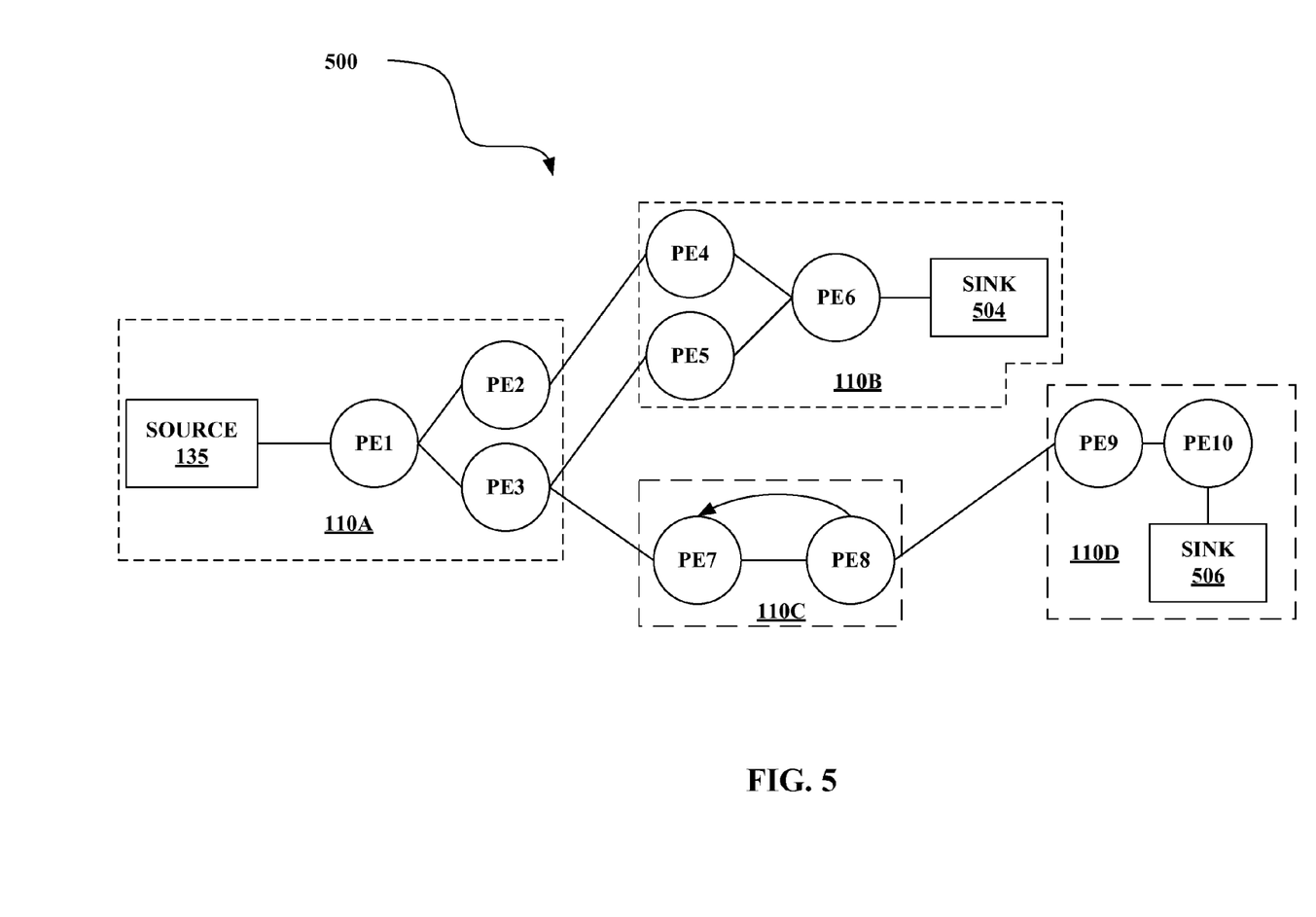
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D. One example of a stream computing application is IBM®'s InfoSphere® Streams (note that InfoSphere® is a trademark of International Business Machines Corporation, registered in many jurisdictions worldwide).

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
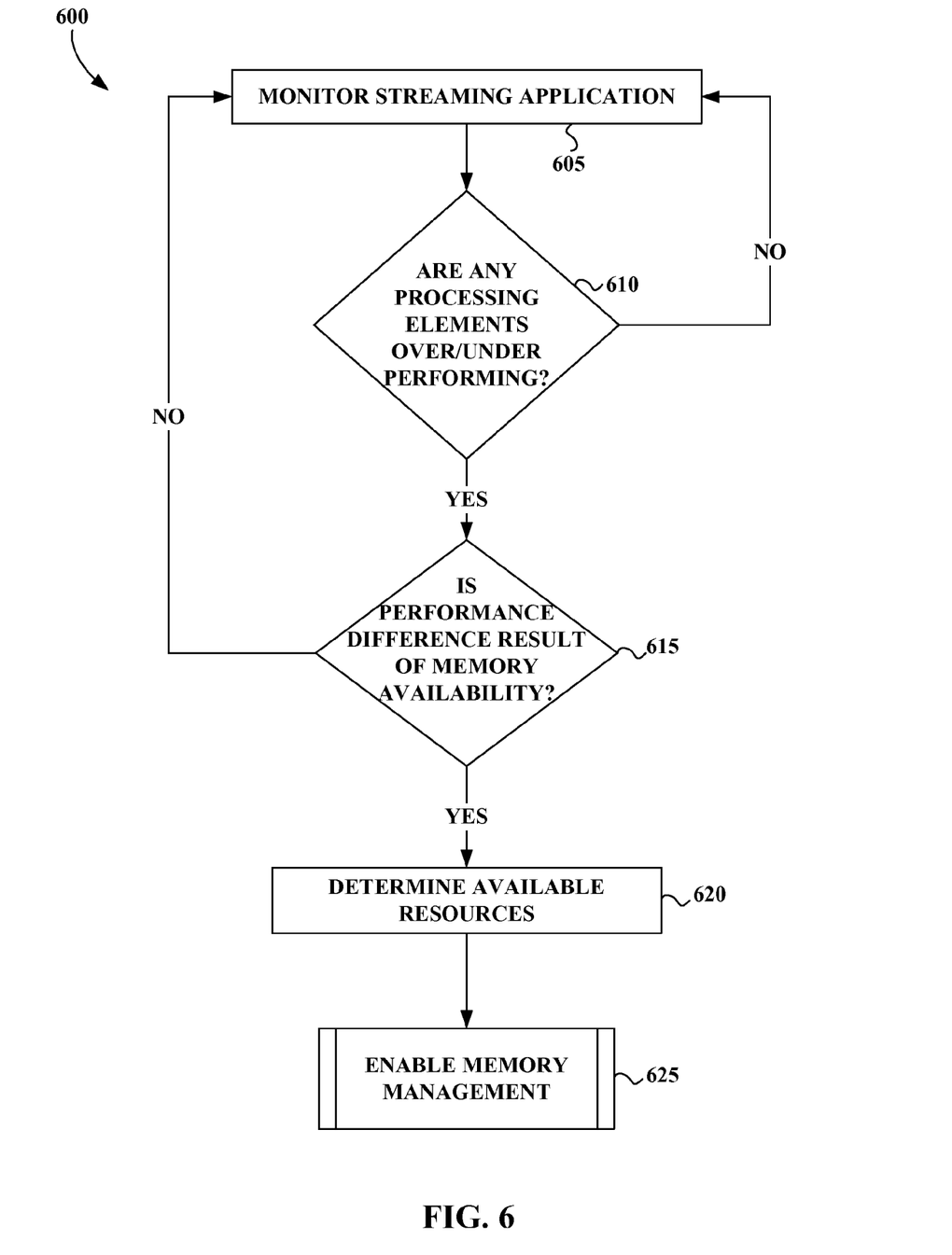
FIG. 6 illustrates a method to determine whether to enable memory management in a streaming application, according to various embodiments.

FIG. 6 illustrates a method 600 to determine whether to enable memory management in a streaming application, according to various embodiments. Memory management may include compressing a memory space associated with one or more processing elements, disassociating and reassociating a new memory space associated with a processing element, or memory virtualization. In some embodiments, memory compression may include a configurable compression factor, which may be system-defined but capable of being overridden by an application programmer. Compressing a memory space associated with one or more processing elements may include techniques that compress less frequently used portions of a processing element or stream operator so that the processing element or stream operator uses a smaller amount of RAM. A compression factor may be the degree to which the memory space compression technique is applied. Disassociating and reassociating a new memory space associated with a processing element may include techniques that move a processing element or stream operator from a first compute node (and disassociating memory space at the first node) to a second node (and reassociating memory space at the second node).

As a first example of disassociating and reassociating a new memory space, assume that processing element PE5 (FIG. 5) on compute node 110B includes stream operators OP1 and OP2 and it is determined that OP1 is underperforming due to a memory constraint. If it is determined that processing element PE4 on compute node 110B is overperforming, memory space associated with OP2 (and PE5) may be disassociated, OP2 moved from PE5 to PE4, and memory space associated with P4 may be associated (or reassociated) with OP2. The effect of this redeployment may be to increase the amount of RAM available to OP1. In a second example using the assumptions about OP1 and OP2, it is determined that processing element PE3 on compute node 110A is overperforming. In this alternative, memory space associated with OP2 (and PE5) may be disassociated, OP2 moved from PE5 to PE3, and memory space associated with PE3 may be associated (or reassociated) with OP2. Again, the effect of this redeployment may be to increase the amount of RAM available to OP1. While these are examples in which a stream operator is redeployed, it should be appreciated that a processing element may be moved or redeployed, either within a compute node or between compute nodes, in order to disassociate and reassociate a new memory space.

Memory virtualization may include techniques in which a compute node accesses a combination of its associated RAM and non-associated RAM as if the combination were entirely RAM associated with the compute node. As one example, assume the processing element PE5 (FIG. 5) running on compute node 110B is underperforming while the processing elements PE1, PE2, and PE3 on running on compute node 110A are overperforming. It is determined that processing element PE5 is underperforming due to a memory constraint and that the processing elements PE1, PE2, and PE3 are overperforming due to a memory freedom. Memory compression may be applied at the compute nodes 110A and 110B. At compute node 110A, memory may be disassociated from processing elements PE1, PE2, and PE3, increasing the amount of available RAM at compute node 110A. At compute node 110B, the newly freed memory space at compute node 110A may be reassociated with the elements PE5 running on compute node 110B.

Generally, the method 600 may include monitoring the performance of a streaming application and modifying a processing element based on one or more performance metrics. In some embodiments, this may include a comparison of performance metrics representing different processing elements, while in other embodiments the performance metric may be a single metric. In some embodiments, the performance metrics being monitored may include processing time for a tuple, throughput, latency, number of tuples queued to be processed, or other similar performance metrics for a processing element.

The method 600 may, in some embodiments, identify a portion of the application that is overperforming relative to the performance of the overall streaming application or to one or more portions of the application and modify a processing element or stream operator. In other embodiments, the method 600 may identify a portion of the application that is underperforming relative to the performance of the overall streaming application or to one or more portions of the application and modify a processing element or stream operator. In yet other embodiments, a processing element or stream operator may not be modified even when a portion of the application is either overperforming or underperforming.

As shown in FIG. 6, the method 600 may begin at operation 605. Operation 605 may include monitoring a streaming application during runtime. The monitoring may be handled by a performance monitor, e.g., performance monitor 340 (FIG. 3), in some embodiments. The performance monitor may maintain statistics about one or more processing elements in the streaming application. These statistics may, for example, be based on a processing time at a processing element in some embodiments. In other embodiments, the performance monitor may maintain statistics related to the throughput of a processing element. In yet other embodiments, the performance monitor may maintain statistics related to the latency of a processing element. The performance monitor may also maintain statistics that include the mean, median, or mode of tuples queued at a processing element to be processed in some embodiments.

In some embodiments, the monitoring operation 605 may also include a logging operation, in which a history of the performance metrics is maintained over time. Logging the performance metrics during runtime may allow a compiler, e.g., compiler 136, to account for actual performance of a streaming application at compile time. The compiler may accordingly deploy the streaming application in a manner which accounts for the performance characteristics that have been observed over time.

At operation 610, the performance monitor may determine how the performance statistics for the individual processing elements compare across the application. Operation 610 may identify whether the streaming application is running smoothly or in a balanced manner, i.e., the processing elements are running at similar speeds across the application. The performance monitor may, in some embodiments, make this determination by evaluating performance metrics. For example, the performance monitor may identify a processing element that has a queue of tuples to be processed where the number of tuples queued falls outside a threshold. For example, a threshold may be a quantity of tuples in the queue or a time period that the queue is present at the processing element. In some embodiments, the threshold may be a system-defined value. In other embodiments, the threshold may be a system-defined value that may be configured by an application programmer or user.

The performance monitor may evaluate the performance metrics by comparing the values of the performance metrics at different processing elements. For example, the performance monitor may determine that a first processing element has a processing time of 0.0001 seconds, while a second processing element (which receives input from the first processing element) has a processing time of 0.0015 seconds. The second processing element has a slower processing time than the first processing element, which may be an indication that the first processing element is overperforming relative to the second processing element, a portion of the application, or the application as a whole. Conversely, the comparison may indicate that the second processing element is underperforming relative to the first processing element, a portion of the application, or the application as a whole.

The performance monitor may evaluate the performance metrics by comparing the throughput of processing elements. As described above, the throughput is the rate at which tuples flow through a processing element. Relying on the example processing times in the previous paragraph, a first processing element may have a throughput of 10,000 tuples per second, while a second processing element may have a throughput of 667 tuples per second. The first processing element is outputting tuples at a rate that is substantially higher than the second processing element, which may cause a bottleneck to occur at the second processing element. For example, the entire output of the first processing element may be provided to the second processing element. Additionally, this substantial difference is an indication that the first processing element may be overperforming and the second processing element may be underperforming, as compared to each other.

The performance monitor may also evaluate the performance metrics by comparing the latency of processing elements. As described above, latency is the time period that a tuple is at a particular processing element—including time spent waiting to be processed as well as time spent actually being processed. If a first processing element has a latency of 0.0003 seconds and a second processing element has a latency of 0.0018 seconds, this may be an indication that the first processing element may be overperforming and the second processing element may be underperforming, as compared to each other.

If the performance monitor determines that no processing elements are either overperforming or underperforming, or overperforming or underperforming inside a threshold, then the performance monitor may continue to monitor the streaming application. The current workload of the system, the hardware constraints, whether other applications are stressing the system, etc. may affect this determination. If the performance monitor determines that any of the processing elements are either overperforming or underperforming, the method 600 may continue with operation 615 in some embodiments.

At operation 615, the performance monitor may determine whether the variation in performance at the various processing elements is the result of a memory management metric that falls outside of a threshold, according to some embodiments. If a memory management metric falls outside of a threshold, it may indicate the presence of a memory constraint or a memory freedom. A memory constraint on or memory freedom for the system, as referred to herein, may include the available memory for a compute node, e.g., compute nodes 110, for a processing element, or for a stream operator falling outside a threshold value. The threshold value may be a system-defined value, but may also be configurable by an application programmer. In various embodiments, a memory constraint may include the compute node, processing element, stream operator, or entire system running out of available memory. A memory constraint may be the compute node, processing element, stream operator, or entire system using more than a particular percent of available memory, e.g., 80 percent. On the other hand, a memory freedom may be the compute node, processing element, stream operator, or entire system using less than a particular percent of available memory, e.g., 60 percent.

At operation 620, the performance monitor may determine resources that may be available to the streaming application. This operation may include gathering information about whether there are resources available which may allow the performance monitor to redeploy the streaming application in a configuration that employs memory management. Accordingly, this may include obtaining statistics, such as whether a memory management capability is available on a particular compute node, whether the compute node has available memory resources or is currently constrained by other running applications, available CPU resources to manage this redeployment, or other similar information that may inform the decision of the performance monitor to redeploy the streaming application.

At operation 625, the performance monitor may enable memory management, according to some embodiments. The process of determining how to enable memory management may include additional steps, which are described in accordance with FIG. 7 below. Generally, enabling memory management in operation 625 may include leveraging the available resource information as determined in operation 620 in a way that employs memory management for a portion of the streaming application. In particular, enabling memory management in operation 625 may include moving a stream operator or processing element that is underperforming because it is running on a compute node with a memory constraint to a compute node running a stream operator or processing element that is overperforming because it is running with a memory freedom.

Figure 7:
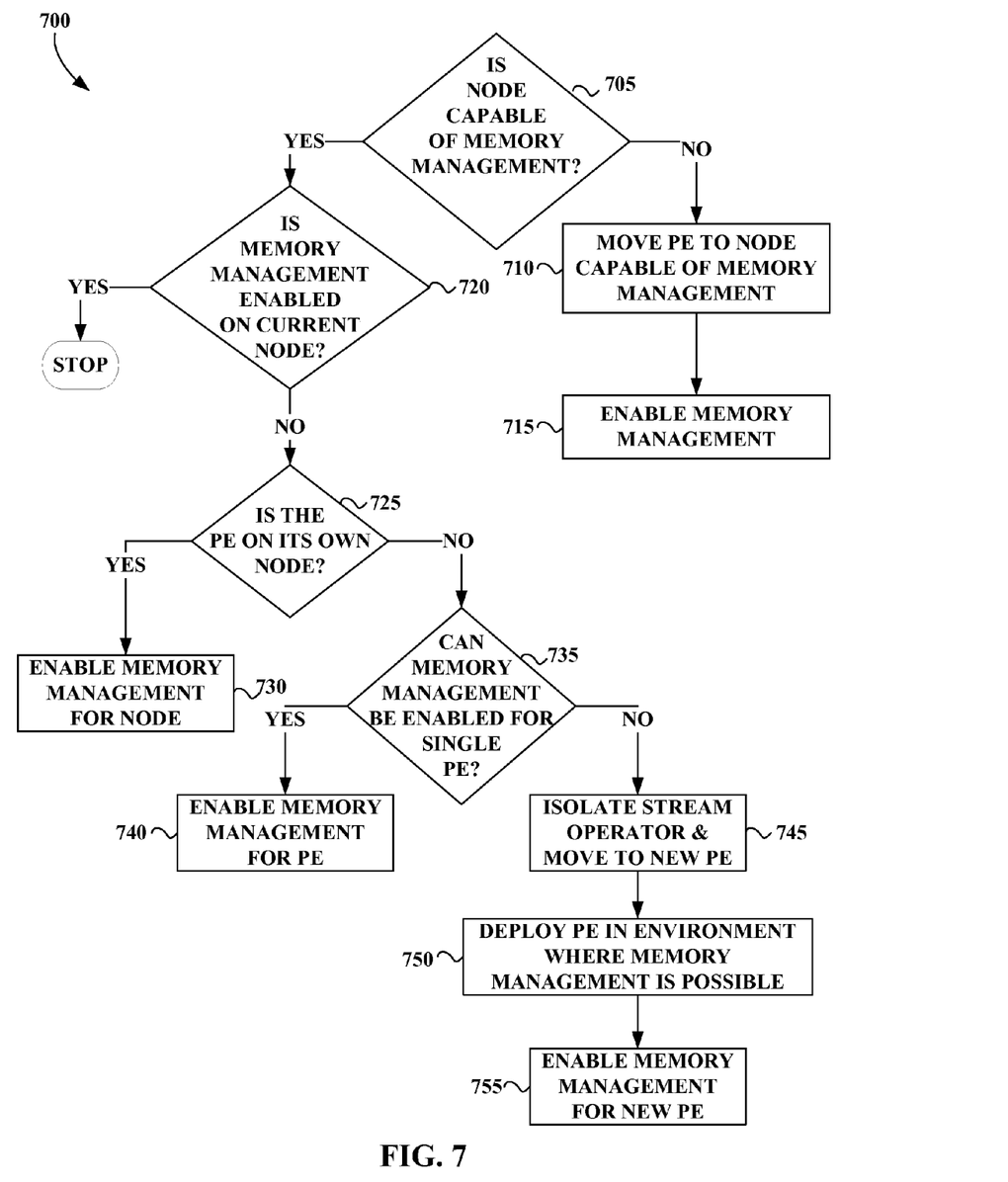
FIG. 7 illustrates a method to determine how to enable memory management in a streaming application, according to various embodiments.

FIG. 7 illustrates a method 700 to determine how to enable memory management in a streaming application, according to various embodiments. The method 700 is a more detailed illustration of operation 625 (FIG. 6), as described above, to enable memory management in a streaming application. In the discussion of FIG. 7, memory management will be referred to generically. However, as described above, memory management may include memory compression, memory disassociation and reassociation, and memory virtualization. The operations of FIG. 7 provide a more detailed view of the method in which the memory management is enabled for a streaming application.

FIG. 7 may begin at operation 705, in which a performance monitor, e.g., performance monitor 340, may determine whether the system on which the streaming application is running is capable of the memory management techniques described above. A compute node 110 may or may not include a capability to alter the memory space associated with a particular processing element, including a capability to compress portions of programs or processes of a stream computing application that are infrequently used into a smaller space in RAM. The operation 705 may include determining whether particular compute nodes 110 of a system are capable of the memory management techniques. If particular processing elements of the streaming application are running on one or more compute nodes that are not capable of memory management, then the performance monitor may move a processing element to a compute node that is capable of memory management at operation 710. At operation 715, the performance monitor may enable memory management on the compute node which is now hosting the processing element. The compute node which is now hosting the processing element may determine which method of memory management to employ.

If it is determined at operation 705 that the compute node running the processing element is in fact capable of memory management, then the method may continue at operation 720. The performance monitor may determine whether the current compute node has already employed memory management at operation 720. If the result is that memory management is enabled, then the method 700 may terminate. Alternatively, the associated memory space may be modified or reconfigured. If, however, memory management is disabled, the method 700 may continue in order to determine how to enable the memory management feature.

At operation 725, the performance monitor may determine whether the processing element is running on its own compute node, e.g., compute node 110. If the processing element is running on its own compute node, then memory management may be enabled for the entire node at operation 730. If the processing element is not running on its own compute node, the method 700 may determine at operation 735 whether memory management may be enabled for the processing element individually. If operation 735 results in a finding that memory management can be enabled for the individual processing element, then memory management may be enabled at operation 740. If, however, memory management cannot be enabled for the processing element, then the method 700 may continue at operation 745, in which the performance monitor attempts to isolate one of the one or more stream operators on the processing element that is overperforming.

At operation 750, the performance monitor may redeploy the stream operator as its own processing element in an environment in which memory management is possible. Additionally, the performance monitor may enable memory management at operation 755 on the newly created processing element.

Though the preceding description refers to the performance monitor completing the steps of the methods 600 and 700, it is to be understood that the runtime manager 134 is capable being configured to perform these methods in some embodiments.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language such as Java, Smalltalk, C++, or the like; (b) conventional procedural programming languages, such as the "C" programming language or similar programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A system for processing a stream of tuples, comprising:
   a plurality of processing elements to receive a stream of tuples, each processing element including one or more stream operators, wherein one or more of the stream operators include code configured to output tuples to one or more other stream operators, the processing elements operating on one or more computer processors, the processing elements forming an operator graph in which tuples flow between stream operators, the operator graph defining one or more execution paths for processing and routing the stream of tuples, each processing element having an associated memory space; and
   a performance monitor configured to:
      monitor the plurality of processing elements, wherein the monitoring includes identifying a first performance metric for a first processing element and identifying the first performance metric for a second processing element; and
      modify one or more of the processing elements, wherein the modifying includes modifying the first processing element based on a comparison of a first value of the first performance metric at the first processing element with a second value of the first performance metric at the second processing element, wherein the modification of the first processing element includes employing memory management of a memory space associated with the first processing element.

2. The system of claim 1, wherein employing memory management of the associated memory space includes employing memory virtualization.

3. The system of claim 1, wherein employing memory management of the associated memory space includes employing memory compression, the memory compression including a configurable compression factor.

4. The system of claim 1, wherein employing memory management of the associated memory space includes disassociating memory from the first processing element and associating memory with the first processing element.

5. The system of claim 1, wherein the modification of the first processing includes modifying the first processing element when the first performance metric falls outside a threshold, the first performance metric including a queue metric at the first processing element.

6. The system of claim 1, wherein the first performance metric includes a processing time metric.

7. The system of claim 1, wherein the first performance metric includes a throughput metric.

8. The system of claim 1, wherein the first performance metric includes a latency metric.

9. The system of claim 1, wherein the modifying includes employing memory management on a compute node containing the first processing element.

10. The system of claim 1, wherein the modifying by the performance monitor includes determining a bottleneck stream operator and redeploying the bottleneck stream operator on a processing element that employs memory management of a memory space associated with the processing element, wherein the bottleneck stream operator outputs tuples to a receiving stream operator at a rate that is faster than the rate at which the receiving stream operator can process the tuples.

11. The system of claim 1, wherein the performance monitor is further configured to:
   log the first and second values of the first performance metric; and
   log the modifying of the first processing element.

12. The system of claim 11, further comprising a compiler to:
   determine a deployment configuration of the plurality of processing elements at compile time, wherein the determining is based on the logging of the first performance metric and the second performance metric.

* * * * *